(12) United States Patent
Kim et al.

(10) Patent No.: US 7,820,295 B2
(45) Date of Patent: Oct. 26, 2010

(54) FLUORINE-DOPED TIN OXIDE TRANSPARENT CONDUCTIVE FILM GLASS AND METHOD OF FABRICATING THE SAME

(75) Inventors: Sang Hak Kim, Gyeonggi-do (KR); Chang Yeol Kim, Gyeonggi-do (KR); Doh Hyung Riu, Seoul (KR); Seung Hun Huh, Seoul (KR); Kwang Youn Cho, Seoul (KR); Chul Kyu Song, Gyeonggi-do (KR)

(73) Assignees: Hyundai Motor Company, Seoul (KR); Korea Institute of Ceramic Engineering and Technology, Seoul (KR)

( * ) Notice: Subject to any disclaimer, the term of this patent is extended or adjusted under 35 U.S.C. 154(b) by 434 days.

(21) Appl. No.: 12/004,367

(22) Filed: Dec. 19, 2007

(65) Prior Publication Data
US 2009/0053511 A1    Feb. 26, 2009

(30) Foreign Application Priority Data
Aug. 22, 2007   (KR)   .................. 10-2007-0084613

(51) Int. Cl.
*B32B 17/06*    (2006.01)
*B05D 1/02*    (2006.01)

(52) U.S. Cl. ................ 428/432; 427/422; 427/427; 427/419.2; 428/428; 428/448; 428/461; 428/469; 428/499; 428/701; 428/702; 428/696

(58) Field of Classification Search .................. None
See application file for complete search history.

(56) References Cited

FOREIGN PATENT DOCUMENTS

| | | |
|---|---|---|
| JP | 62-240107 | 10/1987 |
| JP | 05-085783 | 4/1993 |
| JP | 05-270865 | 10/1993 |
| JP | 05-274917 | 10/1993 |
| KR | 10-2002-0078221 | 10/2002 |

*Primary Examiner*—Ling Xu
(74) *Attorney, Agent, or Firm*—Edwards Angell Palmer & Dodge LLP; Peter F. Corless

(57) ABSTRACT

Disclosed herein are a fluorine-doped tin oxide (FTO) transparent conductive film glass used for defogging purposes comprising a glass layer, a dielectric barrier layer, a functional layer, a metal electrode layer, a plastic intermediate layer, and a glass layer, stacked in this sequential order, in which the functional layer comprises an FTO transparent conductive film having a molar ratio of F to Sn in the range of 0.5 to 2, mainly including a (301) crystal plane and being formed by a spray coating method, and a method of fabricating the same.

8 Claims, 9 Drawing Sheets

FLUORINE-DOPED TIN OXIDE TRANSPARENT CONDUCTIVE FILM GLASS AND METHOD OF FABRICATING THE SAME

CROSS-REFERENCE TO RELATED APPLICATION

This application claims the benefit of Korean Patent Application No. 10-2007-0084613, filed on Aug. 22, 2007, the entire disclosure of which is hereby incorporated by reference.

BACKGROUND

1. Technical Field

The present invention relates to a fluorine-doped tin oxide (FTO) transparent conductive film glass having low resistance and high transmittance and a method of fabricating the same. More particularly, the present invention relates to an FTO transparent conductive film glass used for defogging purposes comprising a glass layer, a dielectric barrier layer, a functional layer, a metal electrode layer, a plastic intermediate layer, and a glass layer, stacked in the order, in which the functional layer comprises an FTO transparent conductive film having low resistance and high transmittance, and a method of fabricating the same.

2. Background Art

Conventionally, electrode materials having high transmittance of visible light have been used to prepare various electrodes of heating resistors for anti-fogging or anti-icing purposes adapted in window glasses of vehicles, airplanes, buildings, etc., or electrodes of display devices such as liquid crystal display devices, plasma display panels, electroluminescence display devices, etc. Such transparent conductive materials include antimony-doped tin oxide (ATO), indium tin oxide (ITO), and the like, in which the ITO having a low specific resistance has been widely used. However, in the event that the ITO transparent conductive film glass is formed by applying heat at about 500° C., electrical properties of the ITO are affected, and its heat resistance, chemical resistance and abrasion resistance, for example, are reduced. Accordingly, extensive research on a fluorine-doped tin oxide (FTO) having high stability under high-temperature and high-voltage, low resistance, and high transmittance has continued to progress.

U.S. Pat. No. 2,566,346 discloses a method of applying a fluoride solution capable of being ionized with a tin compound to a glass substrate heated at about 400° C. U.S. Pat. No. 3,107,177 discloses a method of applying a solution comprising an organic tin compound, 4% hydrochloric solution and an ionizable fluoride to a heated substrate so as to fabricate a transparent, electrically conductive tin oxide thin film having a haze of 1% or less. U.S. Pat. No. 3,677,814 discloses a method in which an organic tin compound having a tin-fluorine bond is formed by pyrolysis. However, the above-described prior art methods have some drawbacks in that as it is difficult to synthesize the organic tin compound used as a main material and the cost of raw material is high, it is difficult to use the organic tin compound for as a windshield for defogging purposes.

As methods of fabricating such a tin oxide film, sputtering, chemical vapor deposition (CVD), and spray methods are known in the art. Here, the first and second methods have drawbacks in that vacuum should be provided, and complicated and expensive equipments for providing gases and precursors are necessary.

U.S. Pat. No. 3,959,565 discloses a method of intermittent spraying a non-aqueous solution in an oxidizing atmosphere to coat a tin oxide. U.S. Pat. Nos. 4,146,657 and 4,500,567 disclose methods of manufacturing an electrically conductive tin oxide thin film by a process of utilizing gaseous chemical compounds. However, the method of intermittent spraying has a drawback in that it requires a lot of processing time, and the methods of utilizing gaseous chemical compounds have a drawback in that the cost of raw material is high. These methods thus are not suitable for preparation of such electrically conductive tin oxide thin film for defogging purposes.

A dielectric barrier layer is disposed between the FTO transparent conductive film and the glass substrate to achieve high transmittance of the windshield. The dielectric barrier layer is introduced to prevent a decrease in transmittance due to change of the color of the windshield which is caused by diffusion of Na ions of the glass layer into the FTO transparent conductive film. Such technologies related to the dielectric barrier layer disposed between the FTO transparent conductive film and the glass substrate are disclosed in U.S. Pat. Nos. 3,378,396, 4,187,336 and 5,028,566. However, the above-described prior art technologies have some drawbacks in that it is difficult to continuously form the transparent conductive film on the dielectric barrier layer and thus the processing speed is very low. Accordingly, the prior art technologies are not suitable for preparing the transparent conductive film as the windshield for defogging purposes.

Although warm air can be used to defog the windshield, it takes a lot of time and it is necessary to operate an air conditioner for a vehicle. To solve the this problem, a wire type window defogging system was proposed, in which fine metal lines are arranged on the plastic intermediate layer such as polyvinyl butyral (PVB) and electricity is applied thereto to generate heat. However, it is difficult to apply such a system to the windshield because it can reduce visibility. Moreover, in the case where an electrode material such as Ag and ITO is thinly coated, the electrode material cost and the manufacturing cost can be highly increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to solve the above-described drawbacks. One object of the present invention is to provide a fluorine-doped tin oxide (FTO) transparent conductive film glass having low resistance and high transmittance and a method of fabricating the same, in which the FTO transparent conductive film glass includes an FTO transparent conductive film having excellent heat resistance, chemical resistance and abrasion resistance, low resistance and high transmittance. Such an FTO transparent conductive film glass, which generates heat when electricity is applied thereto, can be effectively used as a windshield for defogging purposes.

Another object of the present invention is to provide an FTO transparent conductive film glass including an FTO transparent conductive film having a specific molar ratio of fluorine (F) to tin (Sn) to provide low resistance and high transmittance and mainly including a (301) crystal plane.

Still another objects of the present invention is to provide an FTO transparent conductive film glass including an FTO transparent conductive film formed by a spray coating method which can readily control the specific molar ratio and the crystal plane.

In one aspect, provides a fluorine-doped tin oxide (FTO) transparent conductive film glass comprising a glass layer, a dielectric barrier layer, a functional layer, a metal electrode layer, a plastic intermediate layer, and a glass layer, stacked in this sequential order, in which the functional layer comprises an FTO transparent conductive film having a molar ratio of F to Sn in the range of 0.5 to 2 and a ratio between a (200) crystal plane and a (301) crystal plane in the range of 1:4 to 1:1 (texture coefficient).

In another aspect, the present invention provides a method of fabricating a fluorine-doped tin oxide (FTO) transparent conductive film glass, the method comprising: forming a precursor solution by dissolving a tin oxide precursor and a fluorine precursor in deionized water; and spray-coating the precursor solution on the top surface of the dielectric barrier layer in the temperature range of 400 to 550° C. under air atmosphere, thus forming an FTO transparent conductive film having a molar ratio of F to Sn in the range of 0.5 to 2 and a ratio between a (200) crystal plane and a (301) crystal plane in the range of 1:4 to 1:1 (texture coefficient) as the functional layer.

Other aspects of the invention are discussed infra.

DETAILED DESCRIPTION

Figure 1A:
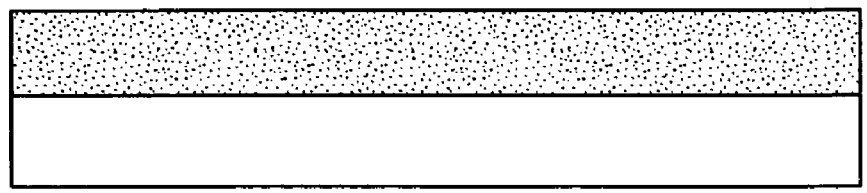
FIG. 1 depicts a process in which a film spray-coated with an FTO coating solution is crystallized.

Hereinafter, preferred embodiments in accordance with the present invention will be described with reference to the accompanying drawings. The preferred embodiments are provided so that those skilled in the art can sufficiently understand the present invention, but can be modified in various forms and the scope of the present invention is not limited to the preferred embodiments.

The present invention provides an FTO transparent conductive film glass for defogging purposes, which comprises a glass layer, a dielectric barrier layer, a functional layer, a metal electrode layer, a plastic intermediate layer, and a glass layer, wherein the functional layer is formed by spray-coating a precursor solution, which is prepared by dissolving a tin oxide precursor and a fluorine precursor in deionized water, on the top surface of the dielectric barrier layer in the temperature range of 400 to 550° C. under air or oxygen atmosphere. Such a spray coating method has advantages, as discussed above, in that the manufacturing cost is lower and the manufacturing process is simpler compared with the conventional sputtering and chemical vapor deposition (CVD) methods. For the purpose of the present invention, any spray coating methods that are known in the art can be used and it is not limited to a any particular method. For example, a spray coating method using an air nozzle or ultrasonic spray nozzle may be employed.

The spray solution for spray-coating the functional layer of the FTO transparent conductive film glass for defogging purposes is characterized in that it does not contain any alcohol compound. Accordingly, the spray solution of the present invention has an advantage that controls the crystal plane to be softened and thus it is possible to form a transparent conductive film having less haze, compared with the conventional spray coating method, in which an alcohol compound is used and a thin film is formed with a rough surface to cause haze seriously. In this case, the tin oxide precursor may be any one of those commonly used in the art and is not limited to any particular one. For example, the tin oxide precursor may be formed of any one selected from the group consisting of $SnCl_4 \cdot 5H_2O$, $SnCl_2$, and $SnCl_2 \cdot 2H_2O$. The fluorine precursor may be $NH_4F$ having no alkyl group. The tin oxide precursor and the fluorine precursor used in the present invention are characterized in that they do not have an alkyl group. The reason for this is that the raw material having the alkyl group is expensive, and that the crystal growth surface in the direction of 200 is mainly grown to roughen the surface of the thin film, thus increasing the haze value remarkably. Moreover, the spray solution of the present invention uses deionized water solely as a solvent. The reason for this is that the deionized water inhibits the crystal growth of the FTO transparent conductive film so that surface microstructures are not excessively grown but smoothly grown to prevent light diffusion occurring on the surface, thus reducing the haze caused from the functional layer comprising the FTO transparent conductive film.

The fluorine content of the FTO transparent conductive film in accordance with the present invention is a significant factor affecting the conductivity and transmittance of the FTO transparent conductive film glass. Accordingly, the molar ratio of fluorine (F) to tin (Sn) is preferably in the range of 0.5 to 2. To control the fluorine content, the spray solution uses deionized water as a solvent, and the tin oxide material and $NH_4F$ are mixed in the molar ratio range of F to Sn. At this time, if the doping amount is too large, an extremely large amount of free electrons is generated in the tin oxide film and diffused to act as resistances against each other, thus reducing the electrical conductivity. Moreover, the number of the free electrons, known as surface plasmon resonance, is increased to reduce the transmittance. Meanwhile, if the doping amount is too small, an increase in the electrical conductivity is insignificant, and the crystal plane is randomly oriented. Also, since the number of conduction electrons in the thin film is small, the transmittance is high; however, the electrical specific resistance becomes high. Accordingly, it is preferable that the above range be maintained.

The spray solution is spray-coated on the top surface of the dielectric barrier layer in the temperature range of 400 to 550° C. under air or oxygen atmosphere. If the spray coating temperature exceeds 550° C., it is higher than the softening point of the glass substrate, and thus the glass substrate may be deformed. Whereas, if the spray coating temperature is below 400° C., the tin oxide is not crystallized, and thus the conductivity and transmittance of the transparent conductive film are significantly reduced. Accordingly, it is preferable that the above temperature range be maintained. Moreover, if not the air or oxygen atmosphere condition, the tin oxide is reduced to form metal tin, and thus the transmittance is significantly reduced. Accordingly, it is preferable that the above condition be maintained.

Figure 1B:
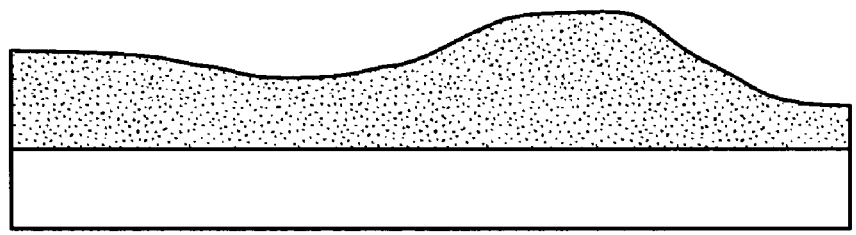
Figure 1C:
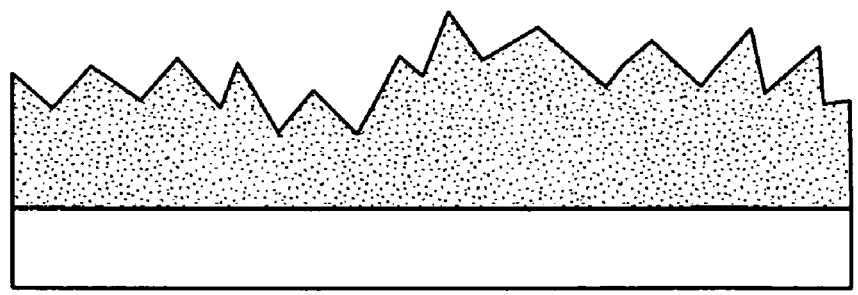
Figure 3:
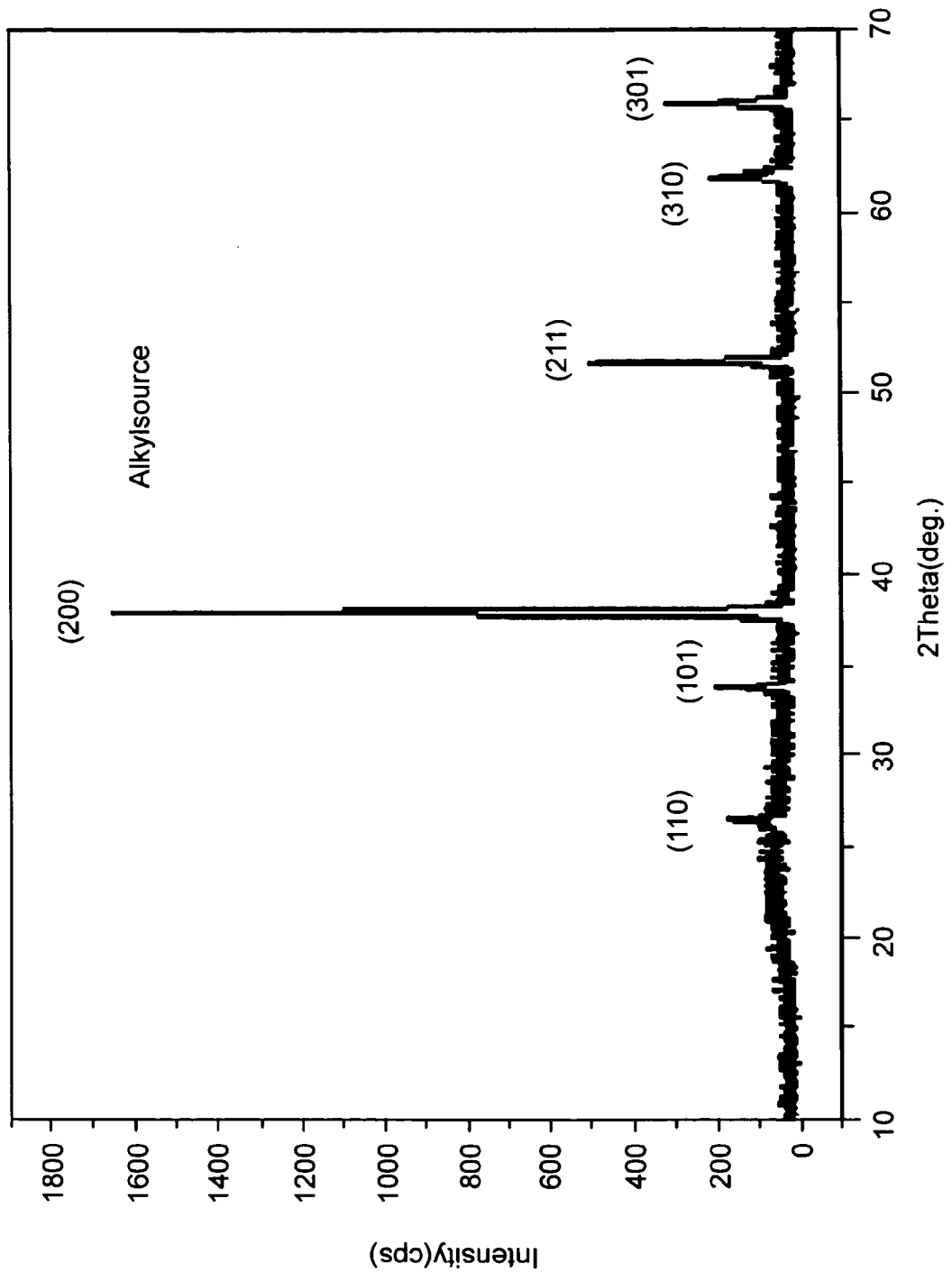
FIG. 3 is a graph depicting the results of X-ray crystal structure (XRD analysis, scan speed: 5°/min) of a film spray-coated with an FTO coating solution containing an alkyl group in Example 2.

The thus formed FTO transparent conductive film is characterized in that the molar ratio of F to Sn is in the range of 0.5 to 2 and the ratio between the (200) crystal plane and the (301) crystal plane is in the range of 1:1 to 1:4. FIG. 1 depicts a process in which a film spray-coated with an FTO coating solution is crystallized. As shown in FIG. 3, in the conventional FTO transparent conductive film, triangular microstructures mainly having the (200) crystal plane are generally observed; however, it can be seen that the crystals in accordance with the present invention include the (301) crystal plane and the (200) crystal plane formed in the middle thereof. That is, such crystal microstructures of the present invention, in which small crystals having the (200) crystal plane are present between large crystals having the (301) crystal plane, reduce the surface roughness to prevent the light diffusion occurring on the surface and reduce the haze, thus increasing the transparency of the thin film. In this case, it is desirable that the above ratio between the (200) crystal plane and the (301) crystal plane be maintained to provide low electrical specific resistance and high visible light transmittance. Moreover, if the thickness of the FTO transparent conductive film exceeds 1.3 μm, the visible light transmittance is significantly reduced, whereas, if it is below 0.1 μm, the electrical resistance is increased. Accordingly, it is preferable that the thickness of the FTO transparent conductive film be maintained in the range of 0.1 to 1.3 μm.

The present invention provides an FTO transparent conductive film glass for defogging purposes comprising a glass layer, a dielectric barrier layer, a functional layer, a metal electrode layer, a plastic intermediate layer, and a glass layer, in which the dielectric barrier layer is formed of $SiO_2$ or a mixture of $SiO_2$ and an oxide of a transition metal selected from the group consisting of Ti, Zr and Al in the temperature range of 200 to 500° C. The dielectric barrier layer is introduced to prevent a decrease in transmittance caused by discoloration due to Na ions of the glass layer being diffused into the FTO transparent conductive film. The dielectric barrier layer is formed with a thickness of 5 to 200 nm in consideration of coating process conditions and optical characteristics such as the visible light transmittance and reflection. The compound including a Si oxide introduced into the dielectric barrier layer may be any one of those commonly used in the art and is not limited to any particular one. For example, the compound may be any one selected from the group consisting of tetraethylorthosilicate (TEOS) and titanium isopropoxide (TIP). Moreover, the thus formed dielectric barrier layer may include a silica or mixed layer of silica and titanium oxide. Furthermore, the dielectric barrier layer is formed in the temperature range of 200 to 500° C. If the temperature exceeds 500° C., it approaches the softening point of glass, and thus the glass may be deformed, whereas, if the temperature is below 200° C., impurities such as carbon may remain in the oxide film. Accordingly, it is preferable that the above temperature range be maintained.

Moreover, in the FTO transparent conductive film glass for defogging purposes in which the glass layer, the dielectric barrier layer, the functional layer, the metal electrode layer, the plastic intermediate layer, and the glass layer are stacked, the metal electrode layer may be any one of those commonly used in the art and is not limited to any particular one. For example, the metal electrode layer may be formed by coating silver paste for high temperature on the substrate, on which the glass layer, the dielectric barrier layer and the functional layer are stacked, by a screen printing method and heat treating the resulting substrate at 500° C. for 10 minutes. Moreover, the thus formed substrate, on which the glass layer, the dielectric barrier layer, the functional layer and the metal electrode layer are stacked, is bonded to another glass layer by applying pressure at 90° C. using a plastic intermediate layer.

In this case, the plastic intermediate layer may be any one of those commonly used in the art and is not limited to any particular one. For example, the plastic intermediate layer may be any one selected from the group consisting of polyvinyl butyral (PVB), ethylene-vinyl acetate copolymer (EVA) and urethane intermediate layers. Especially, since the PVB intermediate layer has excellent penetration resistance and is chemically and optically stable for a long period of time, it is generally used as an assembly of a laminated glass for a vehicle. Accordingly, in order to provide excellent penetration resistance to the FTO transparent conductive film glass, it is more preferable that the PVB intermediate layer be used as the plastic intermediate layer.

Moreover, the glass layer used in the present invention may be any one of those commonly used in the art and is not limited to any particular one. For example, the glass layer may be any one selected from the group consisting of a borosilicate glass, a soda-lime glass for use as an ordinary window and a clear soda-lime glass for a vehicle. Here, since no Na ions are present in the borosilicate glass, unlike the other ordinary glasses, the dielectric barrier layer for preventing Na ions from being diffused is not required.

As described above, the present invention provides the FTO transparent conductive film glass for defogging purposes including the FTO transparent conductive film having excellent heat resistance, chemical resistance and abrasion resistance, low resistance and high transmittance formed using a simpler and cheaper spray coating method. The FTO transparent conductive film glasses according to the present invention have the specific resistance in the range of $3 \times 10^{-4}$ to $12 \times 10^{-4}$ Ω·cm, the sheet resistance in the range of 3 to 12 Ω/sq, the transmittance in the range of 70 to 85%, and the temperature rise rate at 8 V in the range of 3 to 5° C./min.

Accordingly, it is expected that the FTO transparent conductive film glasses, which generates heat when electricity is applied thereto, may be effectively used as a windshield, an ordinary window glass, and a borosilicate glass for defogging purposes.

Hereinafter, the present invention will be described in more detail with reference to Examples; however, the present invention is not limited thereto.

PREPARATION EXAMPLES 1 AND 2

Effect of Molar Ratio of F to Sn

In preparing a unit film comprising a glass layer, a dielectric barrier layer and a functional layer (hereinafter referred to as the FTO transparent conductive film), the FTO transparent conductive film was introduced as the functional layer, and the effect of the molar ratio of F to Sn was studied by changing the molar ratio of F to Sn 0.5 in Preparation Example 1 and 1.76 in Preparation Example 2. Here, a soda-lime glass was used as the glass layer, and the dielectric barrier layer was formed at 500° C. by a sol-gel processing method, thus forming a silicon oxide layer with a thickness of 0.05 μm. Meanwhile, the FTO transparent conductive film was formed by a spray coating method, in which the spray solution was formed by mixing $SnCl_4.5H_2O$ used as a Sn precursor and $NH_4F$ used as an F precursor with 100 g of a water solvent so that the molar ratio of F to Sn may be 0.5 in Preparation Example 1 and 1.76 in Preparation Example 2. The thus formed spray solution was coated on the top surface of a substrate comprising a glass layer and a dielectric barrier layer in a thickness of 1 μm at 530° C. by ultrasonic spray pyrolysis. The process in which such a film spray-coated with the FTO coating solution was crystallized was depicted in FIG. 1.

PREPARATION EXAMPLES 3 AND 4

Effect of Temperature in Preparing Dielectric Barrier Layer

In preparing a unit film comprising a glass layer, a dielectric barrier layer and an FTO transparent conductive layer, the effect of the temperature in preparing the dielectric barrier layer was studied by changing the temperature to 200° C. in Preparation Example 3 and 300° C. in Preparation Example 4 to compare with 500° C. in Preparation Example 2. Other conditions than the temperature in preparing the dielectric barrier layer were the same as Preparation Example 2.

PREPARATION EXAMPLE 5

Effect of Thickness of Dielectric Barrier Layer

In preparing a unit film comprising a glass layer, a dielectric barrier layer and an FTO transparent conductive layer, the effect of the thickness of the dielectric barrier layer was studied by changing the thickness of the dielectric barrier layer to 0.1 μm in this Preparation Example. Other conditions than the thickness of the dielectric barrier layer were the same as Preparation Example 2, in which the thickness of the dielectric barrier layer was 0.05 μm.

PREPARATION EXAMPLES 6 AND 7

Effect of Kind of Dielectric Barrier Layer

In preparing a unit film comprising a glass layer, a dielectric barrier layer and an FTO transparent conductive layer, the effect of the kind of the dielectric barrier layer was studied by changing the kind of the dielectric barrier to $TiO_2$ in Preparation Example 6 and $ZrO_2$ in Preparation Example 7. Other conditions than the kinds of the dielectric barrier layer were the same as Preparation Example 5, in which the kind of the dielectric barrier layer was $SiO_2$.

COMPARATIVE PREPARATION EXAMPLES 1 TO 4

Effect of Molar Ratio of F to Sn

In preparing a unit film comprising a glass layer, a dielectric barrier layer and an FTO transparent conductive layer, the effect of the molar ratio of F to Sn was studied by changing the molar ratio of F to Sn to 0.1 in Comparative Preparation Example 1, 0.3 in Comparative Preparation Example 2, 2.3 in Comparative Preparation Example 3, and 2.5 in Comparative Preparation Example 4. Other conditions than the molar ratio of F to Sn of the FTO transparent conductive film were the same as Preparation Example 2.

COMPARATIVE PREPARATION EXAMPLE 5

Effect of Temperature in Preparing Dielectric Barrier Layer

In preparing a unit film comprising a glass layer, a dielectric barrier layer and an FTO transparent conductive layer, the effect of the temperature in preparing the dielectric barrier layer was studied by changing the temperature to 100° C. in this Comparative Preparation Example. Other conditions than the temperature in preparing the dielectric barrier layer were the same as Preparation Example 2.

COMPARATIVE PREPARATION EXAMPLES 6 AND 7

Effect of Thickness of Dielectric Barrier Layer

In preparing a unit film comprising a glass layer, a dielectric barrier layer and an FTO transparent conductive layer, the effect of the thickness of the dielectric barrier layer was studied by changing the thickness of the dielectric barrier layer to 1 μm in Comparative Preparation Example 6 and 2 μm in Comparative Preparation Example 7. Other conditions than the thickness of the dielectric barrier layer were the same as Preparation Example 2.

COMPARATIVE PREPARATION EXAMPLE 8

Effect of Dielectric Barrier Layer

In preparing a unit film comprising a glass layer, a dielectric barrier layer and an FTO transparent conductive layer, the effect of the dielectric barrier layer was studied by observing the results after removing the dielectric barrier layer. Other conditions than the temperature in preparing the dielectric barrier layer were the same as Preparation Example 2.

COMPARATIVE PREPARATION EXAMPLE 9

Effect of Method of Preparing FTO Transparent Conductive Film

In preparing a unit film comprising a glass layer, a dielectric barrier layer and an FTO transparent conductive layer, the effect of the method of coating the FTO transparent conductive film in which a sol-gel coating process was used to create a reduction atmosphere. Moreover, the method of coating the FTO transparent conductive layer in the reduction atmosphere was performed in a nitrogen and hydrogen atmosphere, and other conditions than the method of preparing the FTO transparent conductive film were the same as Preparation Example 2.

COMPARATIVE PREPARATION EXAMPLES 10 AND 11

Effect of Temperature in Preparing FTO Transparent Conductive Film

In preparing a unit film comprising a glass layer, a dielectric barrier layer and an FTO transparent conductive layer, the effect of the temperature in preparing the FTO transparent conductive film was studied by changing the temperature, at which the FTO transparent conductive film was prepared by a spray coating method, to 200° C. in Comparative Preparation Example 10 and 300° C. in Comparative Preparation Example 11. Other conditions than the temperature in preparing the FTO transparent conductive film were the same as Preparation Example 2.

COMPARATIVE PREPARATION EXAMPLES 12 AND 13

Effect of Thickness of FTO Transparent Conductive Film

In preparing a unit film comprising a glass layer, a dielectric barrier layer and an FTO transparent conductive layer, the effect of the thickness of the FTO transparent conductive film was studied by changing the thickness of the FTO transparent conductive film to 1.5 μm in Comparative Preparation Example 12 and 3 μm in Comparative Preparation Example 13. Other conditions than the thickness of the FTO transparent conductive film were the same as Preparation Example 2.

COMPARATIVE PREPARATION EXAMPLE 14

Effect of Sn Precursor for Preparing FTO Transparent Conductive Film

Figure 5:
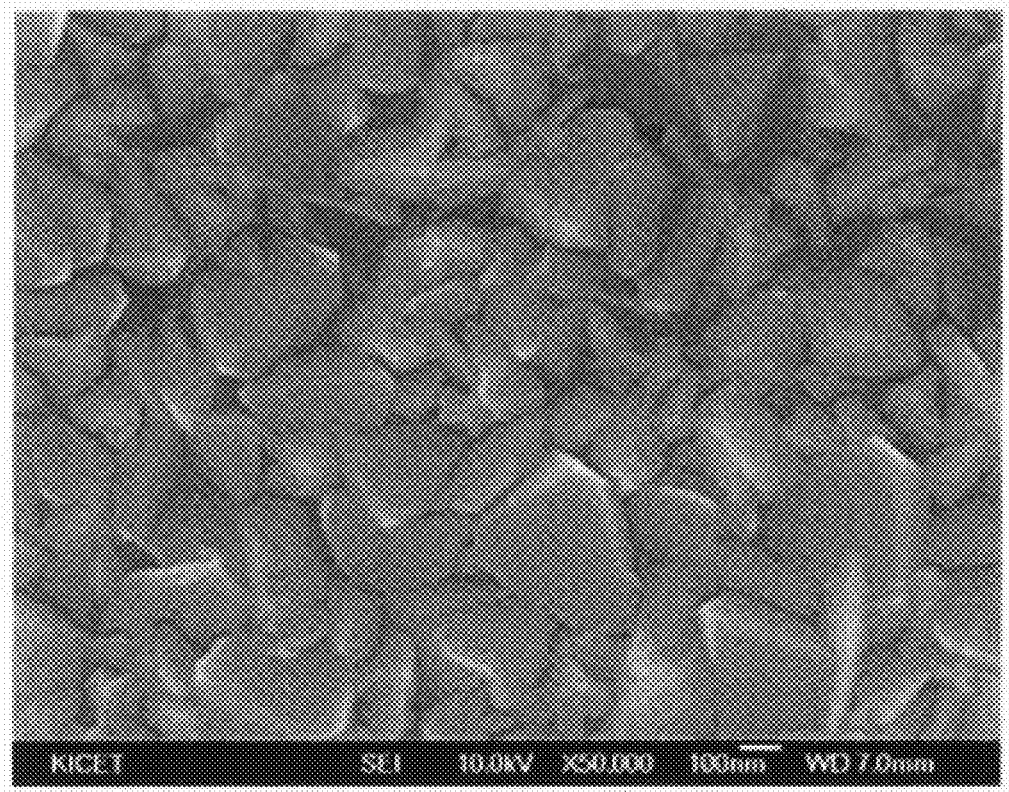
FIG. 5 is an FE-SEM photograph showing microstructures of a film spray-coated with an FTO coating solution containing an alkyl group.

In preparing a unit film comprising a glass layer, a dielectric barrier layer and an FTO transparent conductive layer, the effect of substitution of an alkyl group of the Sn precursor of the FTO transparent conductive film was studied by using dimethyltin dichloride (DMTC), monobutyltin chloride (MBTC) and tetramethyltin (TMT) having an alkyl group as the Sn precursor of the FTO transparent conductive film. Other conditions than the Sn precursor of the FTO transparent conductive film were the same as Preparation Example 2. The X-ray crystal structure and FE-SEM photograph of the thus prepared FTO transparent conductive film are shown in FIGS. 3 and 5, respectively.

COMPARATIVE PREPARATION EXAMPLE 15

Effect of F Precursor for Preparing FTO Transparent Conductive Film

In preparing a unit film comprising a glass layer, a dielectric barrier layer and an FTO transparent conductive layer, the effect of substitution of an alkyl group of the F precursor of the FTO transparent conductive film was studied by using acetylfluoride having an alkyl group as the F precursor of the FTO transparent conductive film. Other conditions than the F precursor of the FTO transparent conductive film were the same as Preparation Example 2.

COMPARATIVE PREPARATION EXAMPLE 16

Effect of Solvent for Preparing FTO Transparent Conductive Film

In preparing a unit film comprising a glass layer, a dielectric barrier layer and an FTO transparent conductive layer, the effect of a solvent of the FTO transparent conductive film was studied by using deionized water having ethanol as the solvent of the FTO transparent conductive film. Other conditions than the solvent of the FTO transparent conductive film were the same as Preparation Example 2.

EXAMPLES 1 AND 2

Effect of Molar Ratio of F to Sn

In preparing an FTO transparent conductive film glass for defogging purposes comprising a glass layer, a dielectric barrier layer, a functional layer, a metal electrode layer, a plastic intermediate layer, and a glass layer, stacked in this sequential order, in which the metal electrode layer was formed by coating silver (Ag) paste by a screen printing method on the unit film comprising the glass layer, the dielectric barrier layer and the FTO transparent conductive film, prepared in Preparation Examples 1 (Example 1) and 2 (Example 2), respectively, and by heating at a temperature of about 500° C. for 10 minutes. Here, the thickness of the metal electrode layers was about 1 μm. A PVB film was introduced as a plastic intermediate layer to compress each of the thus prepared unit films comprising the glass layer, the dielectric barrier layer, the FTO transparent conductive film and the metal electrode layer with a separate glass layer. The FTO transparent conductive film glasses comprising the PVB film were formed by heating and compressing at about 90° C.

EXAMPLE 3

Effect of Crystal Plane of FTO Transparent Conductive Film

In preparing an FTO transparent conductive film glass for defogging purposes comprising a glass layer, a dielectric barrier layer, a functional layer, a metal electrode layer, a plastic intermediate layer, and a glass layer, stacked in this sequential order, in which the functional layer was formed by controlling the solvent, the coating atmosphere, and the starting material under the ultrasonic spray coating process so that the ratio between the (200) crystal plane and the (301) crystal plane might be in the range of 1:1 in this Example, and compared with Example 2. The methods of introducing the metal electrode layer and compressing the unit film comprising the glass layer, the dielectric barrier layer, the FTO transparent conductive film and the metal electrode layer with a separate glass layer were the same as Example 2.

COMPARATIVE EXAMPLES 1 TO 4

Effect of Molar Ratio of F to Sn

In preparing an FTO transparent conductive film glass for defogging purposes comprising a glass layer, a dielectric barrier layer, a functional layer, a metal electrode layer, a plastic intermediate layer, and a glass layer, stacked in sequential order, in which the metal electrode layer was formed by coating silver (Ag) paste by a screen printing method on the unit film comprising the glass layer, the dielectric barrier layer and the FTO transparent conductive film, prepared in Comparative Preparation Examples 1 to 4, respectively, in Comparative Examples 1 to 4, and by heating at a temperature of about 500° C. for 10 minutes. Here, the thickness of the metal electrode layer was about 1 μm. A PVB film was introduced as a plastic intermediate layer to compress each of the thus prepared unit films comprising the glass layer, the dielectric barrier layer, the FTO transparent conductive film and the metal electrode layer with a separate glass layer. The FTO transparent conductive film glasses comprising the PVB film were formed by heating and compressing at about 90° C.

COMPARATIVE EXAMPLES 5 AND 6

Effect of Crystal Plane of FTO Transparent Conductive Film

In preparing an FTO transparent conductive film glass for defogging purposes comprising a glass layer, a dielectric barrier layer, a functional layer, a metal electrode layer, a plastic intermediate layer, and a glass layer, stacked in sequential order, in which the functional layer was formed by controlling the solvent, the coating atmosphere, and the starting material under the ultrasonic spray coating process so that the ratio between the (200) crystal plane and the (301) crystal plane might be in the range of 1:0.1 in Comparative Example 5, and in the range of 1:0.5 in Comparative Example 6. The methods of introducing the metal electrode layer and compressing the unit film comprising the glass layer, the dielectric barrier layer, the FTO transparent conductive film and the metal electrode layer with a separate glass layer were the same as Example 2.

The preparation conditions such as the molar ratio of F to Sn, the crystal plane ratio, the temperature, the kinds of the precursors, and the like in the above-described Preparation Examples 1 to 7, Comparative Preparation Examples 1 to 16, Examples 1 to 3, and Comparative Examples 1 to 6 are summarized and shown in the following Table 1:

TABLE 1

| Classification | Ingredient | Thickness | Temperature (μm) | Molar ratio of F/Sn | Ratio between (200) and (301) crystal planes | Sn Precursor | F Precursor | Solvent | Preparation method | Preparation temperature (° C.) | Thickness (μm) |
|---|---|---|---|---|---|---|---|---|---|---|---|
| Preparation (P) Example 1 | SiO$_2$ | 0.05 | 500 | 0.5 | 1:4 | SnCl$_4$·5H$_2$O | NH$_4$F | Deionized water | Spray coating | 530 | 1 |
| P. Example 2 | " | " | " | 1.76 | " | " | " | Deionized water | " | " | " |
| P. Example 3 | " | " | 200 | " | " | " | " | Deionized water | " | " | " |
| P. Example 4 | " | " | 300 | " | " | " | " | Deionized water | " | " | " |
| P. Example 5 | " | 0.1 | 500 | " | " | " | " | Deionized water | " | " | " |
| P. Example 6 | TiO$_2$ | " | " | " | " | " | " | Deionized water | " | " | " |
| P. Example 7 | ZrO$_2$ | " | " | " | " | " | " | Deionized water | " | " | " |
| Comparative Preparation (C.P.) Example 1 | SiO$_2$ | 0.05 | " | 0.1 | " | " | " | Deionized water | " | " | " |
| C.P. Example 2 | " | " | " | 0.3 | " | " | " | Deionized water | " | " | " |
| C.P. Example 3 | " | " | " | 2.3 | " | " | " | Deionized water | " | " | " |
| C.P. Example 4 | " | " | " | 2.5 | " | " | " | Deionized water | " | " | " |
| C.P. Example 5 | " | " | 100 | 1.76 | " | " | " | Deionized water | " | " | " |
| C.P. Example 6 | " | 1 | 500 | " | " | " | " | Deionized water | " | " | " |
| C.P. Example 7 | " | 2 | " | " | " | " | " | Deionized water | " | " | " |
| C.P. Example 8 | — | 0.05 | " | " | " | " | " | Deionized water | " | " | " |
| C.P. Example 9 | SiO$_2$ | " | " | " | " | " | " | Deionized water | Sol-gel coating | " | 0.3 |
| C.P. Example 10 | " | " | " | " | " | " | " | Deionized water | Spray coating | 200 | 1 |
| C.P. Example 11 | " | " | " | " | " | " | " | Deionized water | " | 300 | " |
| C.P. Example 12 | " | " | " | " | " | " | " | Deionized water | " | 530 | 1.5 |
| C.P. Example 13 | " | " | " | " | " | " | " | Deionized water | " | " | 3 |
| C.P. Example 14 | " | " | " | " | 1:0.1 | DMTC MBTC TMT | " | Deionized water | " | " | 1 |

TABLE 1-continued

| Classification | Ingredient | Thickness | Temperature (μm) | Molar ratio of F/Sn | Ratio between (200) and (301) crystal planes | Sn Precursor | F Precursor | Solvent | Preparation method | Preparation temperature (°C.) | Thickness (μm) |
|---|---|---|---|---|---|---|---|---|---|---|---|
| C.P. Example 15 | " | " | " | " | " | SnCl$_4$·5H$_2$O | Acetylfluoride | Deionized water | " | " | " |
| C.P. Example 16 | " | " | " | " | " | " | NH$_4$F | Ethanol + Deionized water | " | " | " |
| Example 1 | " | " | " | 0.5 | 1:4 | " | " | Deionized water | " | " | " |
| Example 2 | " | " | " | 1.76 | " | " | " | Deionized water | " | " | " |
| Example 3 | " | " | " | " | 1:1 | " | " | Deionized water | " | " | " |
| Comparative (C) Example 1 | " | " | " | 0.1 | 1:4 | " | " | Deionized water | " | " | " |
| C. Example 2 | " | " | " | 0.3 | " | " | " | Deionized water | " | " | " |
| C. Example 3 | " | " | " | 2.3 | " | " | " | Deionized water | " | " | " |
| C. Example 4 | " | " | " | 2.5 | " | " | " | Deionized water | " | " | " |
| C. Example 5 | " | " | " | 1.76 | 1:0.1 | " | " | Deionized water | " | " | " |
| C. Example 6 | " | " | " | " | 1:0.5 | " | " | Deionized water | " | " | " |

TEST EXAMPLE

The properties of the FTO transparent conductive films prepared in accordance with Preparation Examples 1 to 7, Comparative Preparation Examples 1 to 16, Examples 1 to 3, and Comparative Examples 1 to 6 were measured and shown in the following Table 2.

1. Specific Resistance

The specific resistance is directed to the evaluation of electrical characteristics of the transparent conductive films. The specific resistance values were measured by a 4-point probe method and by multiplying the thickness of the thin film thereto. The results measured using the Hall coefficient measurement HMS 3000 are shown in Table 2.

2. Sheet Resistance

The sheet resistance is a property directly related to the final moisture removal characteristics of the transparent conductive film. The lower the resistance is, the higher the heat generation amount is at low voltage. Accordingly, it is possible to readily remove the moisture at low voltage. The method of measuring the sheet resistance and the measurer are the same as the method of measuring specific electrical resistance. The sheet resistance denotes an electrical resistance value in which the thickness of the thin film is not considered. The results of the sheet resistance are shown in Table 2.

3. Transmittance

The transmittance in visible light region is important in the transparent conductive film. If the thickness of the transparent conductive film is increased, the transmittance tends to be reduced. Moreover, the transmittance may be reduced by the orientation of crystals in the thin film, the size of crystal particles, and the roughness of the surface. The transmittances were measured in the wavelength of 200 to 2500 nm using a transmittance measurer (UV/VIS/NIR photospectrometer, JASCO, V570), and the results are shown in Table 2.

4. XRD Diffraction Characteristics

The XRD diffraction characteristics were measured to evaluate the crystallinity of the thin film and the orientation of the crystals in the thin film. The results measured by XRD (Rigaku, 2311-B) are shown as texture coefficient of the (200) and (301) crystal planes in FIGS. 2 and 3.

5. Heating Characteristics According to Applied Voltages

Figure 8:
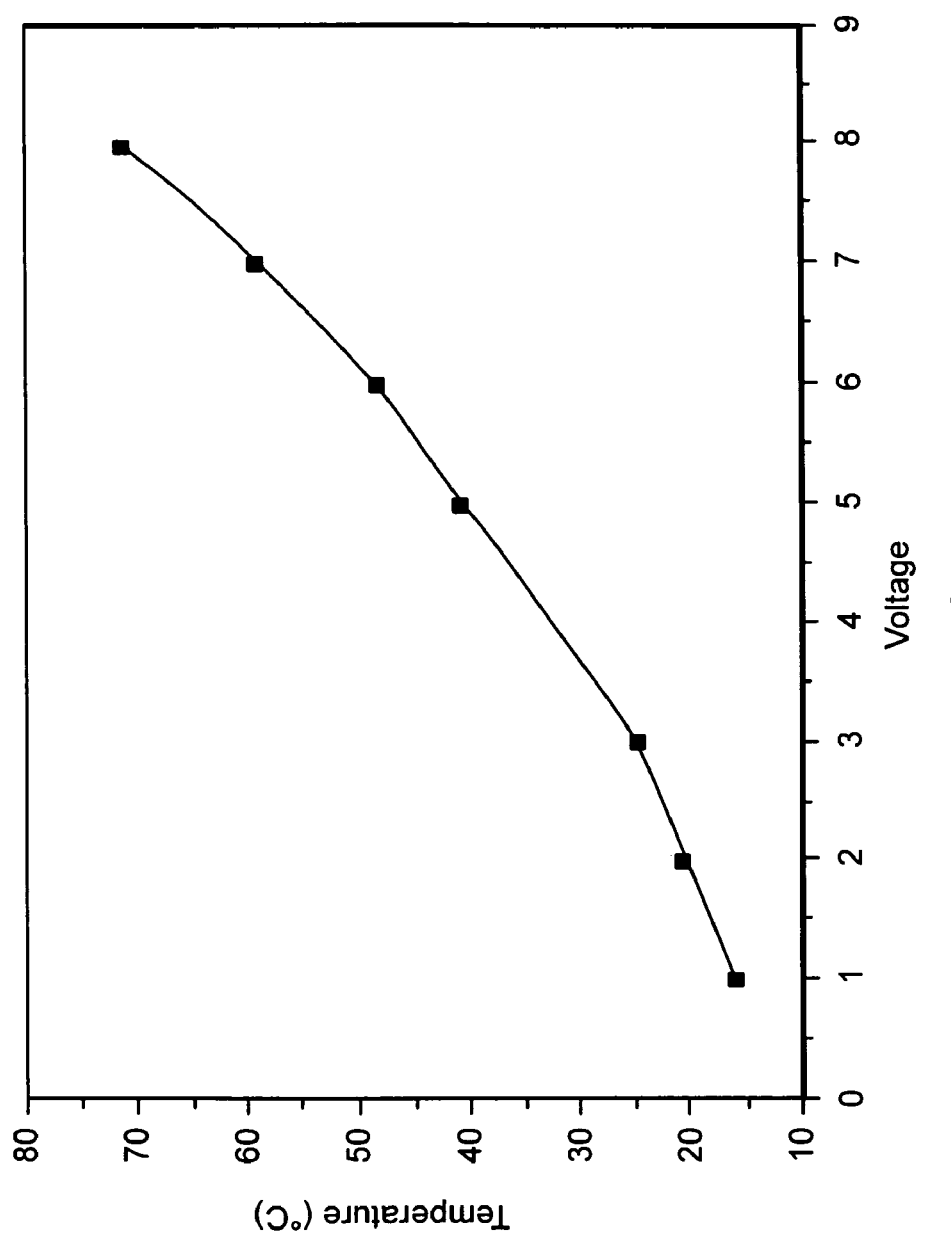
FIG. 8 is a graph depicting heating characteristics according to applied voltages in Example 2 (heating temperatures about 300 seconds after applying voltages)
Figure 9:
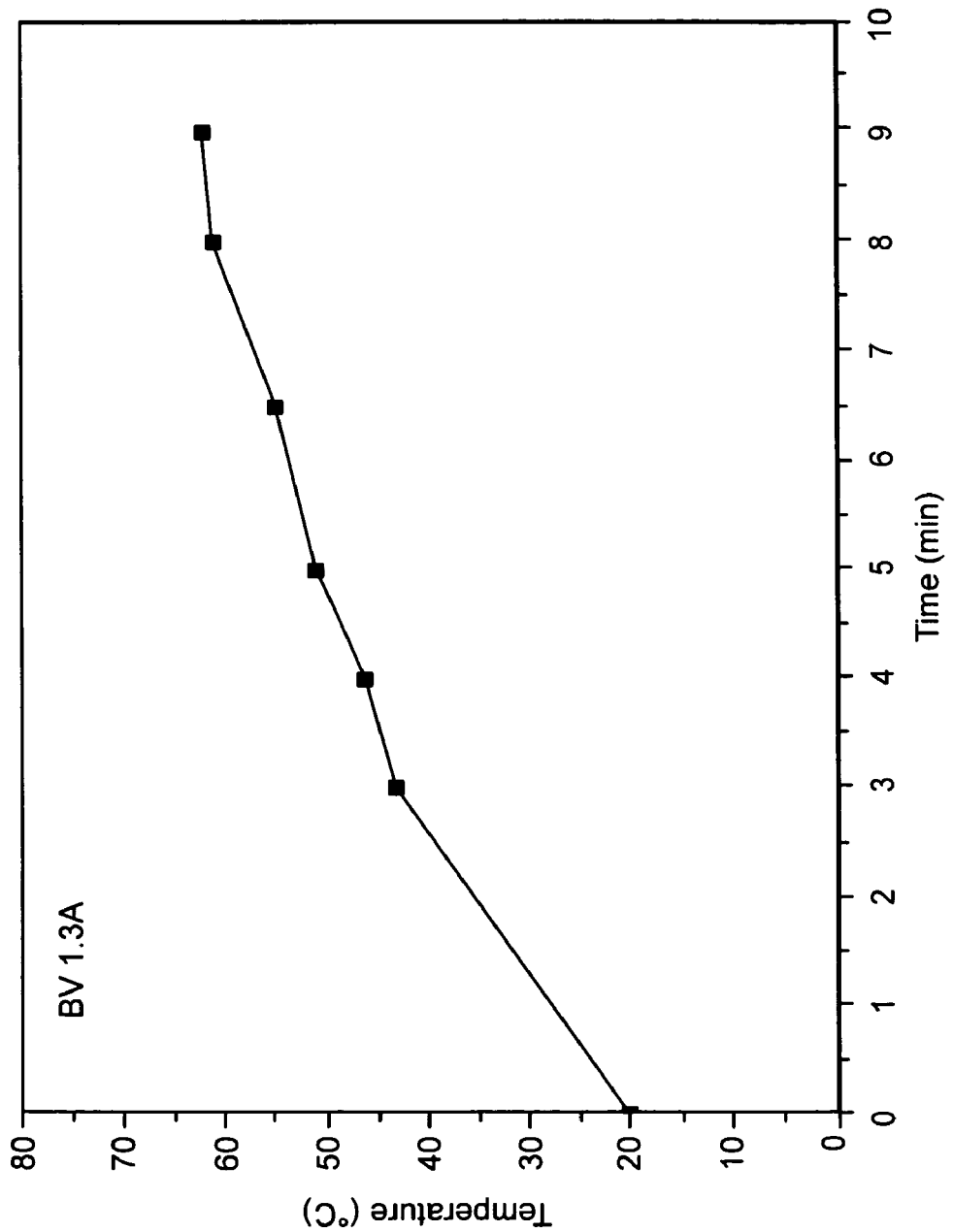
FIG. 9 is a graph depicting heating temperatures according to time lapse after applying a constant voltage of 8 V in Example 2.

Since dehumidifying characteristics of the transparent conductive film are caused by heat generated when applying a voltage, the heating characteristics can be evaluated by measuring the increase in temperature by heat generated when applying a constant voltage to the glass. The temperature changes were measured using a potentiostat and a K-type thermometer when applying a constant voltage, and the measured results are shown in FIGS. 8 and 9.

TABLE 2

| Classification | | Specific Resistance (×10-4 Ω·cm) | Sheet Resistance (Ω/sq) | Transmittance (% at 550 nm) | Remark |
|---|---|---|---|---|---|
| Preparation (P) Example 1 | Unit film | 12 | 12 | 80 | |
| P. Example 2 | " | 7 | 7 | " | |
| P. Example 3 | " | " | " | " | |
| P. Example 4 | " | " | " | " | |

TABLE 2-continued

| Classification | | Specific Resistance (×10−4 Ω·cm) | Sheet Resistance (Ω/sq) | Transmittance (% at 550 nm) | Remark |
|---|---|---|---|---|---|
| P. Example 5 | " | " | " | " | |
| P. Example 6 | " | " | " | " | |
| P. Example 7 | " | " | " | " | |
| Comparative Preparation (C.P.) Example 1 | " | 50 | 50 | " | |
| C.P. Example 2 | " | 30 | 30 | " | |
| C.P. Example 3 | " | 10 | 10 | 75 | |
| C.P. Example 4 | " | 20 | 20 | 80 | |
| C.P. Example 5 | " | 10 | 10 | 55 | |
| C.P. Example 6 | " | 7 | 7 | 60 | |
| C.P. Example 7 | " | 7 | 7 | 60 | |
| C.P. Example 8 | " | 100 | 100 | 70 | |
| C.P. Example 9 | " | 5 | 170 | 80 | Sol-gel coating method with thickness 0.3 μm |
| C.P. Example 10 | " | — | — | — | Film not formed |
| C.P. Example 11 | " | — | — | — | Film not formed |
| C.P. Example 12 | " | 2.3 | 1.6 | 40 | |
| C.P. Example 13 | " | 4.8 | 1.6 | 30 | |
| C.P. Example 14 | " | 3 | 3 | 50 | |
| C.P. Example 15 | " | 3 | 3 | 50 | |
| C.P. Example 16 | " | 3 | 3 | 50 | |
| Example 1 | FTO transparent conductive film glass | 12 | 12 | 80 | |
| Example 2 | FTO transparent conductive film glass | 7 | 7 | 80 | |
| Example 3 | FTO transparent conductive film glass | 4 | 4 | 75 | |
| Comparative (C) Example 1 | FTO transparent conductive film glass | 50 | 50 | 80 | |
| C. Example 2 | FTO transparent conductive film glass | 30 | 30 | 80 | |
| C. Example 3 | FTO transparent conductive film glass | 10 | 10 | 75 | |
| C. Example 4 | FTO transparent conductive film glass | 20 | 20 | 80 | |
| C. Example 5 | FTO transparent conductive film glass | 3 | 3 | 50 | |
| C. Example 6 | FTO transparent conductive film glass | 3 | 3 | 50 | |

According to Table 2, in the unit films comprising the glass layer, the dielectric barrier layer and the FTO transparent conductive film, the electrical resistance and transmittance characteristics of the FTO transparent conductive films according to the molar ratios of F to Sn in Preparation Examples 1 and 2, Comparative Preparation Examples 1 to 4, Examples 1 and 2, and Comparative Examples 1 to 4 could be confirmed. Moreover, it could be ascertained that, if the doping amount of F compared with Sn was too high or too small, the specific resistance and the sheet resistance were all increased by the influence of the free electrons and, especially, if the doping amount of F was too large, the transmittance is slightly reduced.

As a result of the measurement in the electrical resistance and transmittance characteristics according to the temperatures in preparing the dielectric barrier layers in accordance with Preparation Examples 2 to 4 and Comparative Preparation Example 5, it could be understood that the dielectric barrier layers formed in the temperature range of 200 to 500° C. could prevent Na ions from being diffused sufficiently and had low specific resistance and high transmittance of visible light.

Moreover, it could be confirmed that the specific resistance and the sheet resistance of the FTO transparent conductive films prepared in accordance with Preparation Example 5 and Comparative Preparation Examples 6 and 7 were hardly changed according to the thickness of the dielectric barrier layers; however, if the thickness of the dielectric barrier layer was too large, the visible light transmittance was significantly reduced.

As a result of the measurement in the electrical resistance and transmittance characteristics according to the kinds of the dielectric barrier layers in Preparation Examples 5 to 7 and Comparative Preparation Example 8, it could be understood that the oxide films such as $SiO_2$, $TiO_2$ and $ZrO_2$ acted as the barrier layer for preventing Na ions from being diffused. However, in the event that such a dielectric barrier layer was not present, the Na ions were not prevented from being diffused, and thus the visible light transmittance was reduced. Moreover, it could be confirmed that such Na ions absorbed the free electrons in the FTO transparent conductive film and thus the specific resistance and the sheet resistance of the FTO transparent conductive film were significantly increased.

The FTO transparent conductive film prepared by the sol-gel coating method in accordance with Comparative Preparation Example 9 had a drawback in that the coating process should be carried out at least two times to form a thickness of more than 0.3 μm. It could be seen that the thus prepared FTO transparent conductive film had high sheet resistance. Moreover, if the temperature in preparing the FTO transparent conductive film was less than 400° C. in Comparative Preparation Examples 10 and 11, the tin oxide was not crystallized, and thus the thin film was not formed. Accordingly, it could be understood that the temperature range of 400 to 550° C. was most appropriate in consideration of the deformation of the glass substrate. In the case where the thickness of the FTO transparent conductive films prepared in accordance with Comparative Preparation Examples 11 and 12 was large, the sheet resistance could be reduced; however, the visible light transmittance was reduced.

Figure 6:
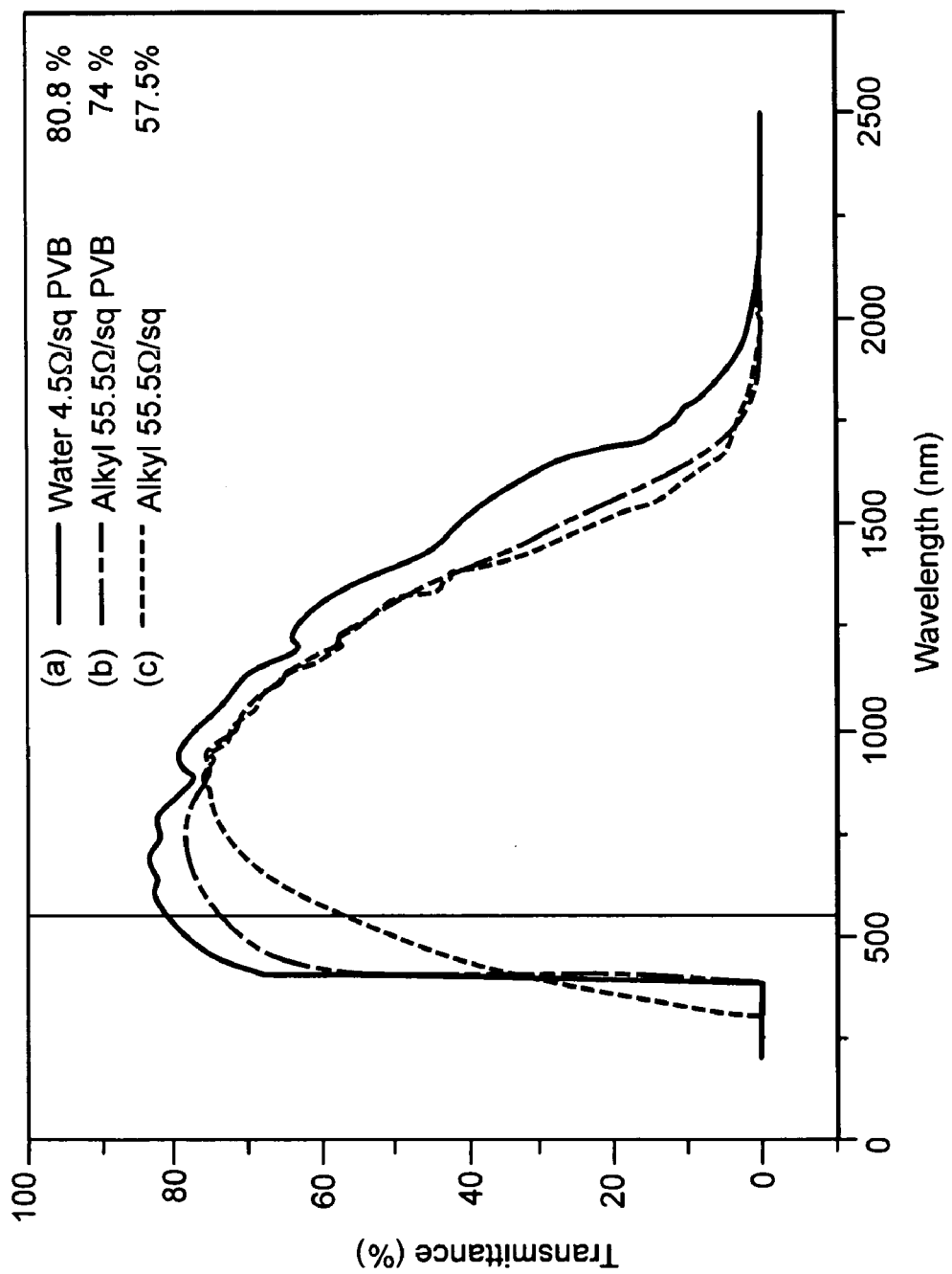
FIG. 6 is a graph depicting optical transmittances of (a) an FTO transparent conductive film glass formed using deionized water as a solvent, (b) an FTO transparent conductive film glass formed using a solvent containing an alkyl group, and (c) an FTO transparent conductive film formed using a solvent containing an alkyl group.
Figure 7:
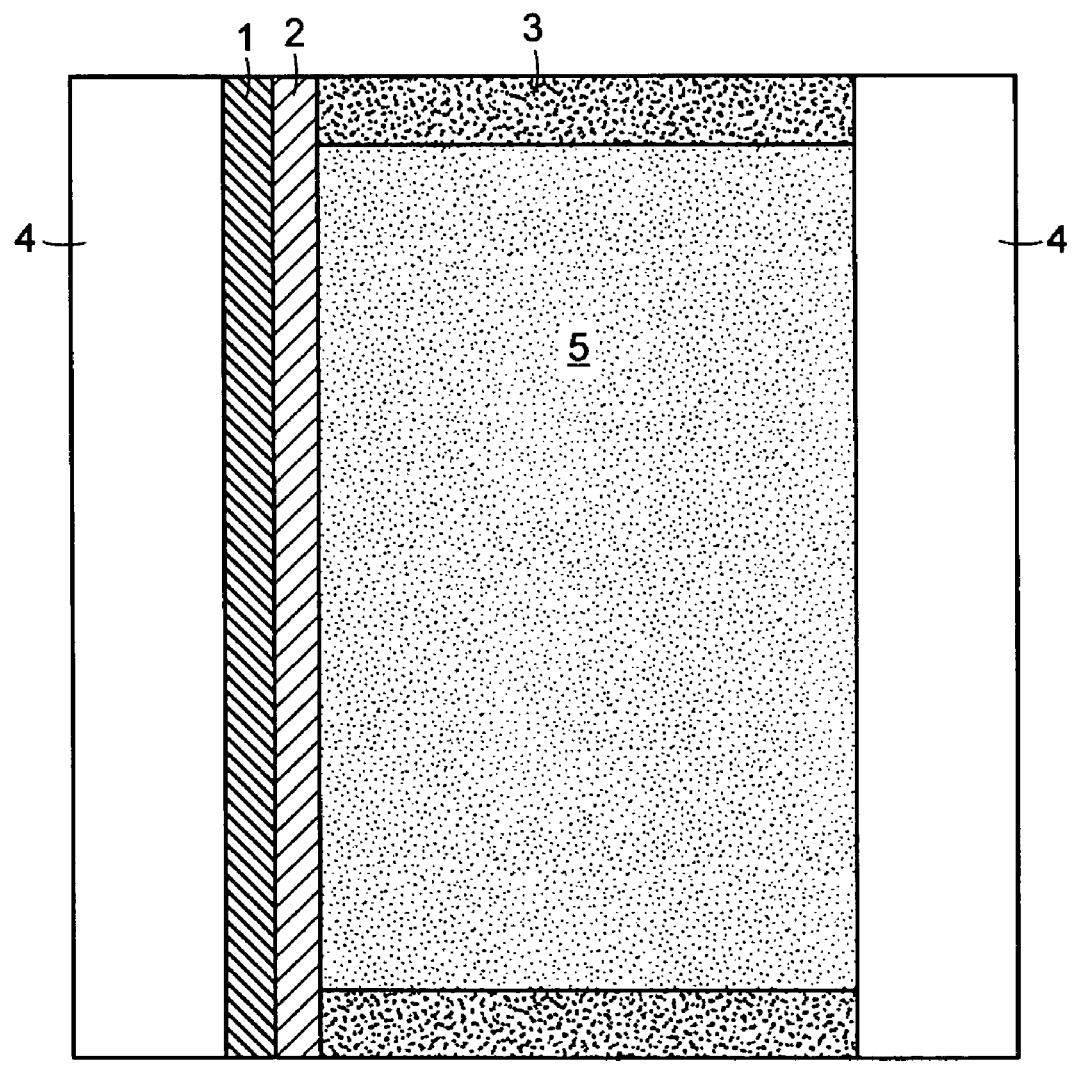
FIG. 7 is a schematic diagram depicting the configuration of an FTO transparent conductive film glass for defogging purposes having low resistance and high transmittance, in which reference numeral 1 denotes an oxide barrier layer, 2 denotes a transparent conductive film, 3 denotes an electrode, 4 denotes a glass substrate, and 5 denotes a polymer film.

As a result of the analysis of the FE-SEM in FIG. 5, the XRD in FIG. 3, and the electrical resistance and visible light transmittance in FIG. 6 of the FTO transparent conductive films prepared according to the alkyl group substitution of the Sn precursor and the F precursor in Comparative Preparation Examples 14 and 15, it could be understood that the alkyl group accelerated the crystal growth of the (200) crystal plane of the FTO transparent conductive film and hence the surface of the thin film was roughened, thus reducing the visible light transmittance significantly.

Moreover, in the event that acetylfluoride was added to the solvent of the FTO transparent conductive film in Comparative Preparation Example 16, it could be ascertained that the alkyl group contained in the solvent accelerated the crystal growth of the (200) crystal plane of the FTO transparent conductive film and reduced the visible light transmittance.

Furthermore, it could be confirmed that the electrical resistance and the visible light transmittance were highly affected by the ratio between the (200) and (301) crystal planes of the FTO transparent conductive films in Comparative Preparation Examples 14 to 16, Examples 2 and 3 and Preparation Examples 5 and 6.

Figure 2:
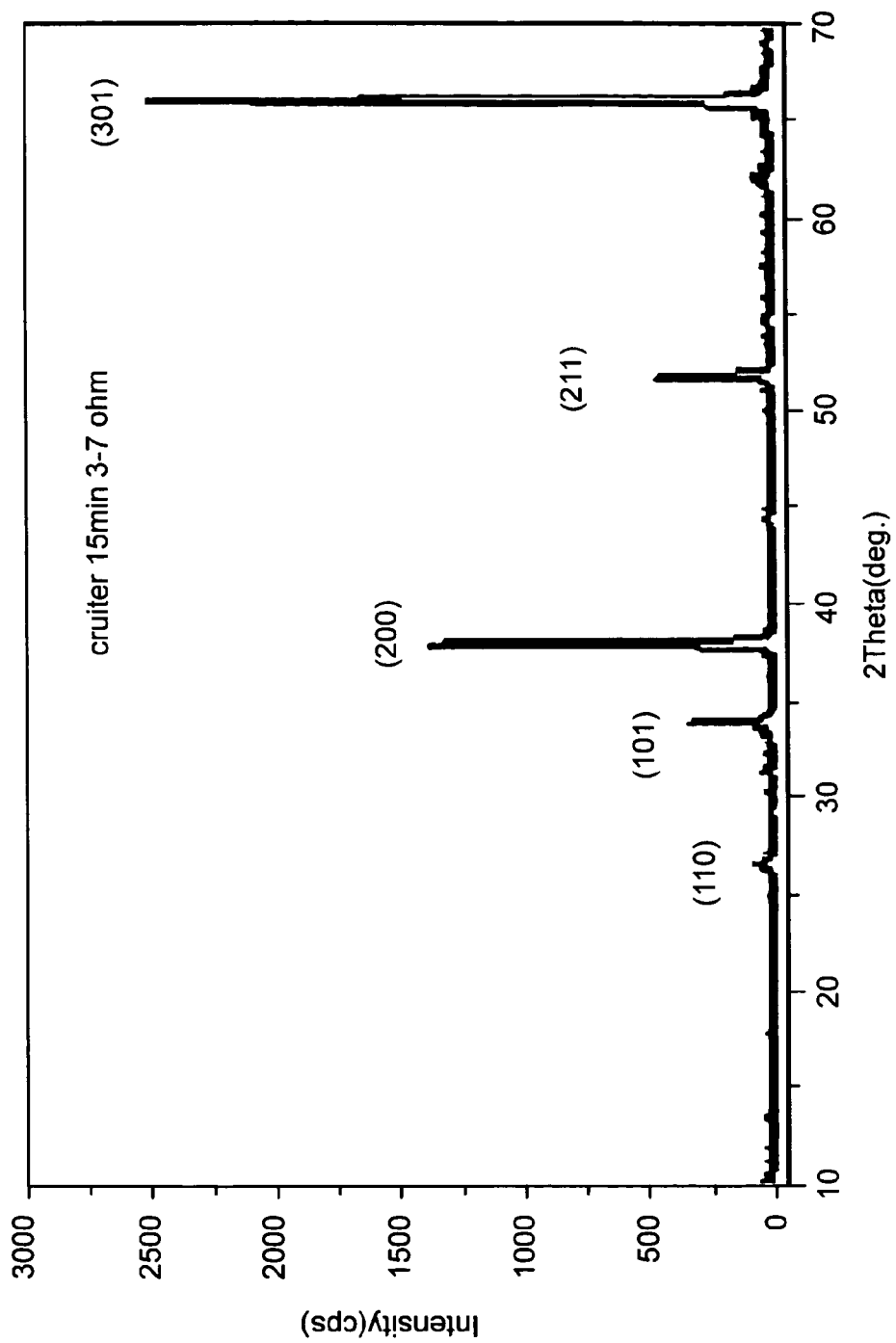
FIG. 2 is a graph depicting the results of X-ray crystal structure (XRD analysis, scan speed: 5°/min) of a film spray-coated with an FTO coating solution in Example 2.
Figure 4:
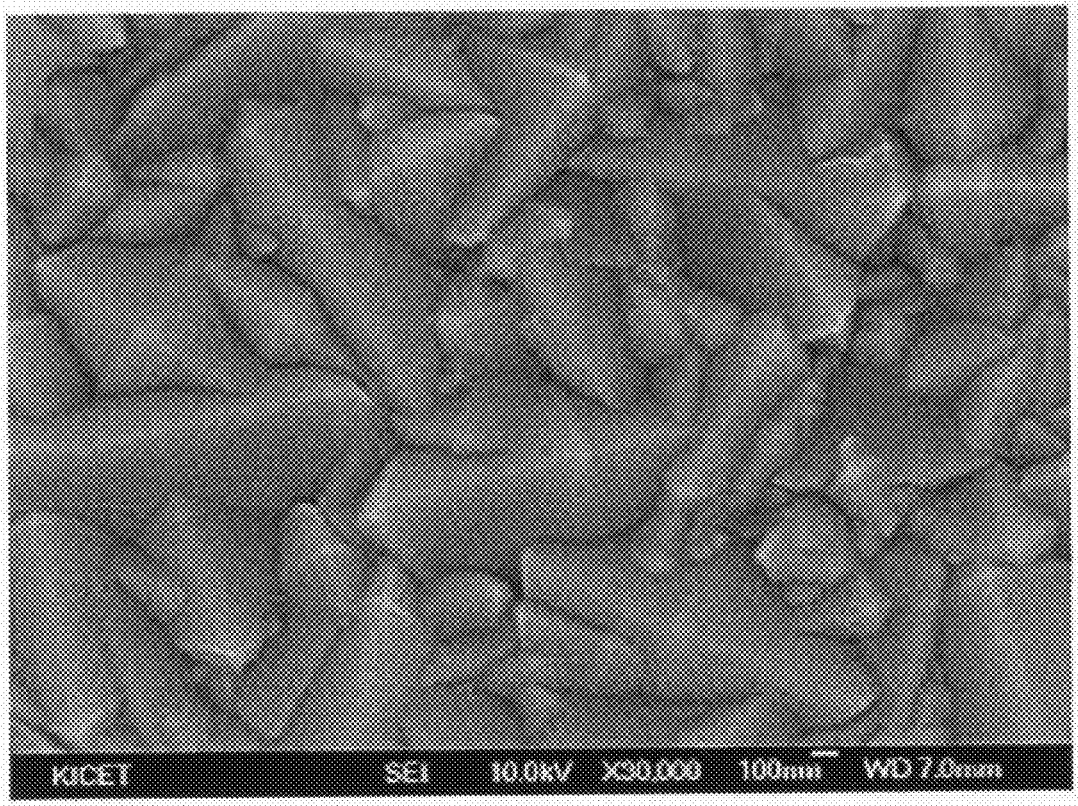
FIG. 4 is a field emission-scanning electron microscope (FE-SEM) photography showing microstructures of a film spray-coated with an FTO coating solution.

Like this, it could be understood from the XRD analysis in FIGS. 2 and 3 and the FE-SEM observation in FIGS. 4 and 5 that the reason why the FTO transparent conductive film having high transmittance could be formed according to the crystal planes was that there were formed long crystals (crystals in the direction of 200) and crystals having a small particle diameter (crystals in the direction of 301) were formed between the long crystals. It was analyzed that, with the above-described crystal structures, it was possible to prevent the light from being diffused and thus more transparent crystal film could be formed.

As shown in FIG. 8, an FTO transparent conductive film glass having a sheet resistance of 4.5 Ω/sq was prepared for the purpose of defogging the windshield, and the heating temperatures measured according to applied voltages were shown in the graph. Here, it could be confirmed that the heating temperature was increased linearly according as the voltage was increased and, especially, when a voltage of 8 V was applied, the heating temperature was increased from about 16° C. up to 71° C. Moreover, as shown in the graph of FIG. 9, the heating temperature was increased about 40° C. from 20° C. to 60° C. about 9 minutes after applying a constant voltage of 8 V. Such heating characteristics mean that the temperature can be increased up to the melting point of water even from the outer environment of −40° C. within about 9 minutes after applying a voltage of 8 V. Accordingly, the FTO transparent conductive film glass in accordance with the present invention can be effectively used as a windshield for defogging purposes.

As described above, the present invention provides an FTO transparent conductive film glass comprising a glass layer, a dielectric barrier layer, a functional layer, a metal electrode layer, a plastic intermediate layer, and a glass layer, stacked in sequential order, in which the functional layer comprises an FTO transparent conductive film formed by a spray coating method. Accordingly, the present invention has advantageous effects in that the manufacturing cost is low, the manufacturing process is simple, and the FTO transparent conductive film glass has excellent heat resistance, chemical resistance and abrasion resistance, low resistance and high transmittance. Moreover, such an FTO transparent conductive film glass, which generates heat when electricity is applied thereto, may be effectively used as a windshield, an ordinary window glass, and a borosilicate glass for defogging purposes.

As above, preferred embodiments of the present invention have been described and illustrated, however, the present invention is not limited thereto, rather, it should be understood that various modifications and variations of the present invention can be made thereto by those skilled in the art without departing from the spirit and the technical scope of the present invention as defined by the appended claims.

What is claimed is:

1. A fluorine-doped tin oxide (FTO) transparent conductive film glass comprising a glass layer, a dielectric barrier layer, a functional layer, a metal electrode layer, a plastic intermediate layer, and a glass layer, stacked in this sequential order, in which the functional layer comprises an FTO transparent conductive film having a molar ratio of F to Sn in the range of 0.5 to 2 and a ratio between a (200) crystal plane and a (301) crystal plane in the range of 1:4 to 1:1 (texture coefficient).

2. The FTO transparent conductive film glass of claim 1, wherein the thickness of the FTO transparent conductive film is in the range of 0.1 to 1.3 μm.

3. The FTO transparent conductive film glass of claim 1, wherein the dielectric barrier layer is formed of $SiO_2$ alone or a mixture of $SiO_2$ and an oxide of a transition metal selected from the group consisting of Ti, Zr and Al and has a thickness of 5 to 200 nm.

4. The FTO transparent conductive film glass of claim 1, wherein the FTO transparent conductive film has a specific resistance in the range of $3 \times 10^{-4}$ to $12 \times 10^{-4}$ Ω·cm, a sheet resistance in the range of 3 to 12 Ω/sq, a transmittance in the range of 70 to 85%, and a temperature rise rate at 8 V in the range of 3 to 5° C./min.

5. A method of fabricating an FTO transparent conductive film glass used for defogging purposes comprising a glass layer, a dielectric barrier layer, a functional layer, a metal electrode layer, a plastic intermediate layer, and a glass layer, stacked in this sequential order, the method comprising:

forming a precursor solution by dissolving a tin oxide precursor and a fluorine precursor in deionized water; and spray-coating the precursor solution on the top surface of the dielectric barrier layer in the temperature range of 400 to 550° C. under air atmosphere, thus forming an FTO transparent conductive film having a molar ratio of F to Sn in the range of 0.5 to 2 and a ratio between a (200) crystal plane and a (301) crystal plane in the range of 1:4 to 1:1 (texture coefficient) as the functional layer.

6. The method of claim 5, wherein the tin oxide precursor is formed of any one selected from the group consisting of $SnCl_4.5H_2O$, $SnCl_2$, and $SnCl_2.2H_2O$.

7. The method of claim 5, wherein the fluorine precursor is formed of any one selected from the group consisting of $NH_4F$, HF, and acetyl fluoride.

8. The method of claim 5, wherein the dielectric barrier layer is formed of any one selected from the group consisting of $SiO_2$, $TiO_2$, and $ZrO_2$ and is formed on the top surface of the glass layer in the temperature range of 200 to 500° C.

* * * * *